May 25, 1937.   A. VIGNE   2,081,314
JOURNAL BEARING
Filed Sept. 16, 1935   2 Sheets-Sheet 1

INVENTOR.
ALBERT VIGNE
BY
ATTORNEY.

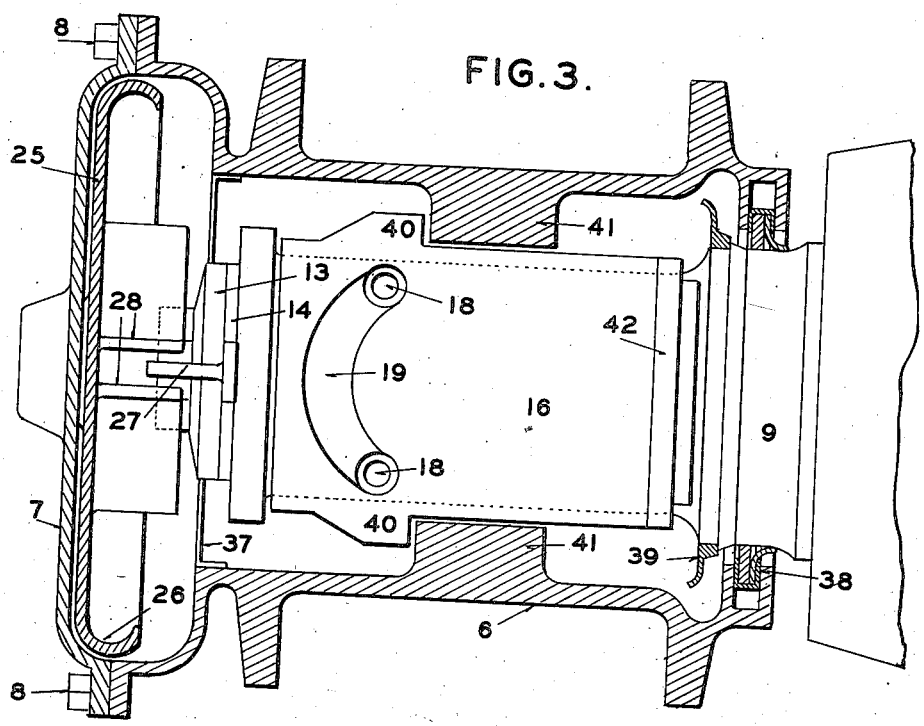
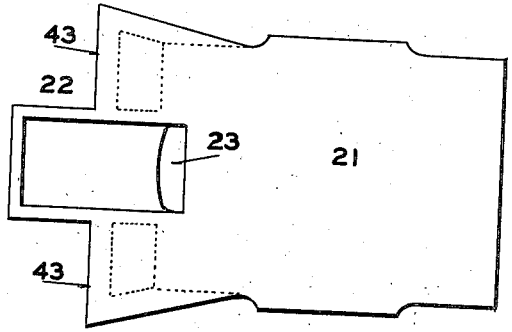
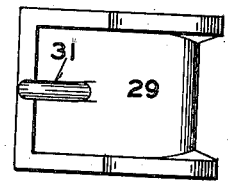

Patented May 25, 1937

2,081,314

UNITED STATES PATENT OFFICE 2,081,314

JOURNAL BEARING

Albert Vigne, Webster Groves, Mo., assignor to National Bearing Metals Corporation, St. Louis, Mo., a corporation of New York Application September 16, 1935, Serial No. 40,706

1 Claim. (Cl. 308—85)

My invention relates to a journal bearing and particularly to a journal bearing adapted for use in railway cars. Such journal bearings are usually of what is known as the standard A. R. A. type, in which the journal of the axle is homogeneous in structure and an integral part of the axle, and is journaled in a babbitt lined brass bearing. Lubrication is provided by oil saturated waste which comes in contact with the bottom of axle journal. The principal objections to this type of journal bearing are the short life of the bearing caused by the wear of relatively soft journal surface and the resultant improper fit between the bearing and journal, and the "grabbing" of waste between the journal and bearing causing ercessive heating which may melt the babbitt lining of the brass. A further objection is that waste rubbing against the journal surface tends to become glazed thus interfering with its capillary attraction and hence the efficiency of the lubrication. Further, when functioning most effectively, it supplies only sufficient oil for lubricating purposes and not enough to materially aid in dissipating heat from the bearing.

One object of my invention is to provide a hardened journal bushing with slow wearing characteristics which may be easily and inexpensively renewed so that dimensional limits may be maintained which so nearly approach the original dimensions that a good seat is always secured between the journal and bearing.

Another object of my invention is to provide a lubrication system whereby liquid, such as oil, is circulated through and over the bearing to provide adequate dissipation of heat in addition to proper lubrication and to circulate such oil in flowing channels to avoid the introduction of air into the oil with consequent formation of foam or froth.

A further object of the invention is to secure an arrangement of bearing and journal whereby close fits may be provided and maintained under running conditions beyond that which would be practicable without adequate circulation of lubricant through and over the bearing.

Figure 1:
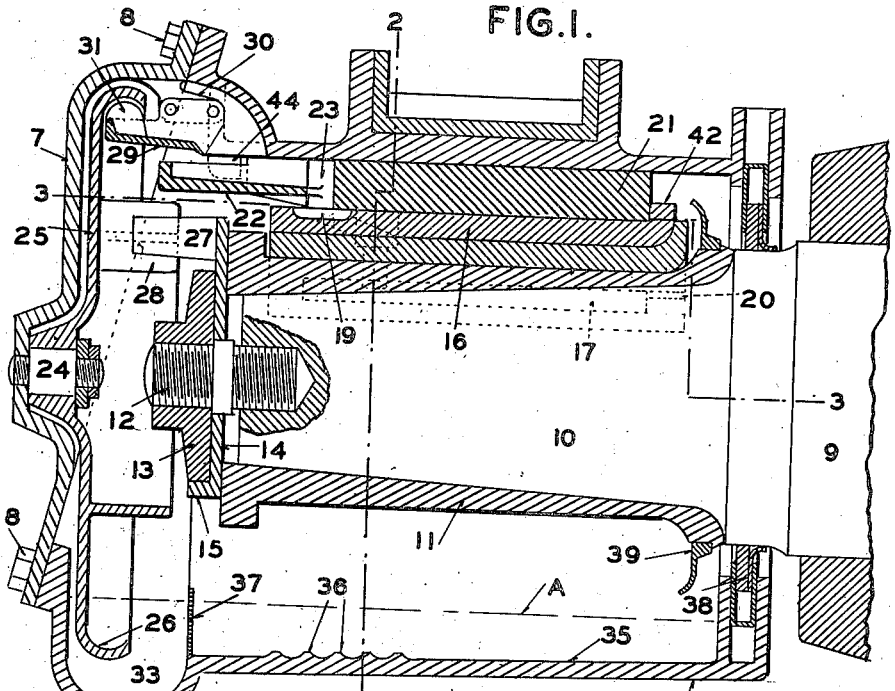
Figure 2:
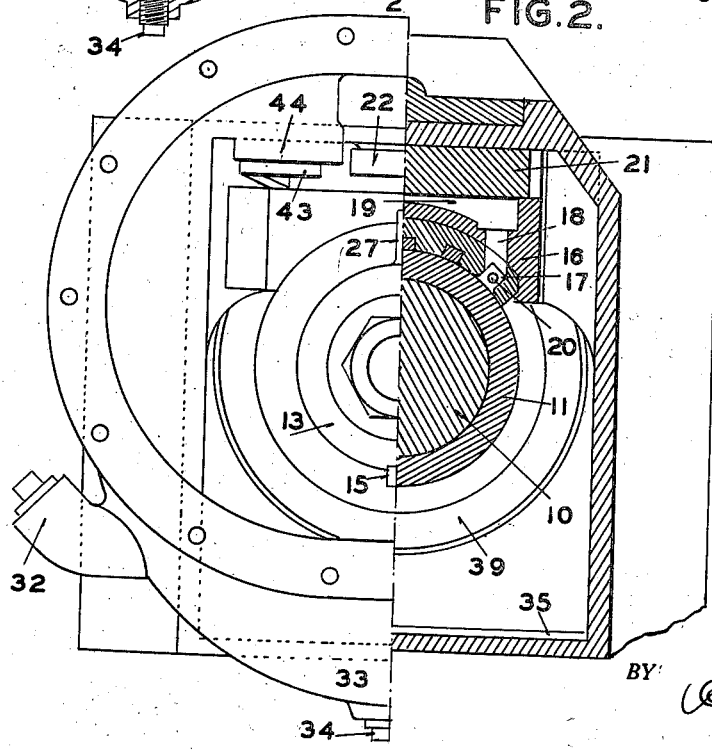

In the accompanying drawings which illustrate one form of journal box made in accordance with my invention, Figure 1 is a vertical longitudinal section; Figure 2 is an end view, partly in elevation, with the cap removed, and partly in section on the line 2—2 of Figure 1; Figure 3 is a horizontal section taken on the line 3—3 of Figure 1; Figure 4 is a top plan view of the wedge; and Figure 5 is a top plan view of the spoon.

The journal box or housing 6 is similar in form to the standard A. R. A. box but in place of the usual hinged cover is provided with a cap 7 secured in place by bolts 8. The axle 9 is provided with a tapered end 10 to fit the corresponding tapered bore of a hardened carbon steel journal bushing 11. The bushing is shrunk in place upon the tapered end of the axle by heating in boiling water before placing it upon the cold axle. A threaded stud 12 carried by the axle is engaged by a nut 13 which assists in forcing the bushing on the axle and in retaining it in position after shrinkage. A plate 14 positioned between the nut on the end of the bushing is provided with a projection 15 serving as a lock for the nut.

Seated upon the bushing is a brass 16 which is preferably of the bimetallic type shown and described in my prior Patent No. 1,941,768 of January 2, 1934. Formed in the lower face of the brass adjacent to each edge thereof is a longitudinal channel 17. Each of the channels 17 communicate through a vertical passage 18 with a transverse channel 19 formed in the upper face of the brass. The rear end of each of the channels 17 is provided with an opening 20 to deliver oil on the thrust collar of the journal bushing to provide thrust lubrication.

Seated upon the brass is a wedge 21 which is of the usual construction except that it is provided with a forwardly projecting trough shaped lip 22 communicating through opening 23 with the transverse channel 19 in the brass. Pivoted to the cap 7 by means of a stud 24 is a disk 25 having formed on its periphery an internal trough 26. This disk is rotated by means of a dog 27 on the plate 14 which engages with one or the other of a pair of lugs 28 according to the direction of rotation of the axle. This form of driving connection permits of the necessary vertical and horizontal movement of the axle relative to the box. After the disk has been secured in position on the cap, a trough shaped member 29 which may be termed a spoon is riveted to a lug 30 projecting from the cap. The spoon is provided with a blade or scraper 31 which projects into the trough 26 to remove oil therefrom and deliver it by means of the spoon to the lip of the wedge. Oil is supplied to the disk from the bottom of the box which serves as a lubricant reservoir and is preferably kept filled to about the point indicated by the broken line A, Figure 1. Oil may be supplied to the reservoir through a filling plug 32 which may be located at the proper height to provide a gauge for the oil level. The forward part of the box is extended downwardly to form an oil sump 33 provided with a drain plug 34. The bottom 35 of the box is inclined slightly toward the sump and is provided with transverse ribs 36 forming baffles to collect sediment from the oil as it flows over them. A strainer 37 is located adjacent to the oil sump. A dust guard 38 of any desired type surrounds the axle and to prevent access of oil to this guard, an oil deflector 39 is applied to the rear end of the journal bushing.

To retain the brass and wedge in position in the box, the brass is provided with lugs 40 which are held against the box columns 41 by a flange 42 on the rear end of the brass and bearing against the rear end of the wedge. The front end of the wedge is provided with shoulders 43 contacting with lugs 44 on the box. The entire assembly is thus held against horizontal movement by stops, vertical movement being prevented by the weight of the car.

The operation of my device is as follows: Rotation of the axle drives the disk 25 which carries the oil up in the trough 26 to the spoon, where it is removed by the blade 31. Due to the viscosity of the oil, sufficient lubricant will be supplied even at slow speeds. As the speed increases centrifugal force tends to keep the trough filled, thus supplying more oil. In this manner the amount of oil circulated through and over the bearing is directly proportional to the speed of the axle. Oil removed by the blade 31 is delivered from the spoon to the trough shaped lip of the wedge and thence through passage 23 to the channel 19 in the upper face of the brass. From channel 19 the oil flows down through opening 18 to the longitudinal passage 17 in the bearing face of the brass to lubricate the same and also through opening 20 to lubricate the thrust bearing. As only a limited amount of oil can pass through between the brass and axle bearing in a given time, it is obvious that the excess oil supplied at high speeds will flow over and around the bearing, thus providing an effective medium for dissipating heat generated therein. The oil after flowing either through or around the bearing returns to the reservoir where sediment is removed by the action of the baffles and strainer so that uncontaminated oil is supplied to the bearing.

Having fully described my invention, what I claim as new and desire to secure by Letters Patent of the United States is:

In a device of the class described, the combination with a journal box provided with an oil reservoir, of a removable cap for said box, an axle in the box, a brass seated on said axle, said brass having a passage for oil, a cup-shaped disk pivoted to said cap, and a spoon for transferring oil from said disk to the passage in the brass, said spoon being carried by the cap.

ALBERT VIGNE.